J. M. BARNETT.
ARMOR FOR TIRES.
APPLICATION FILED JUNE 8, 1910.
994,969.
Patented June 13, 1911.
2 SHEETS—SHEET 1.
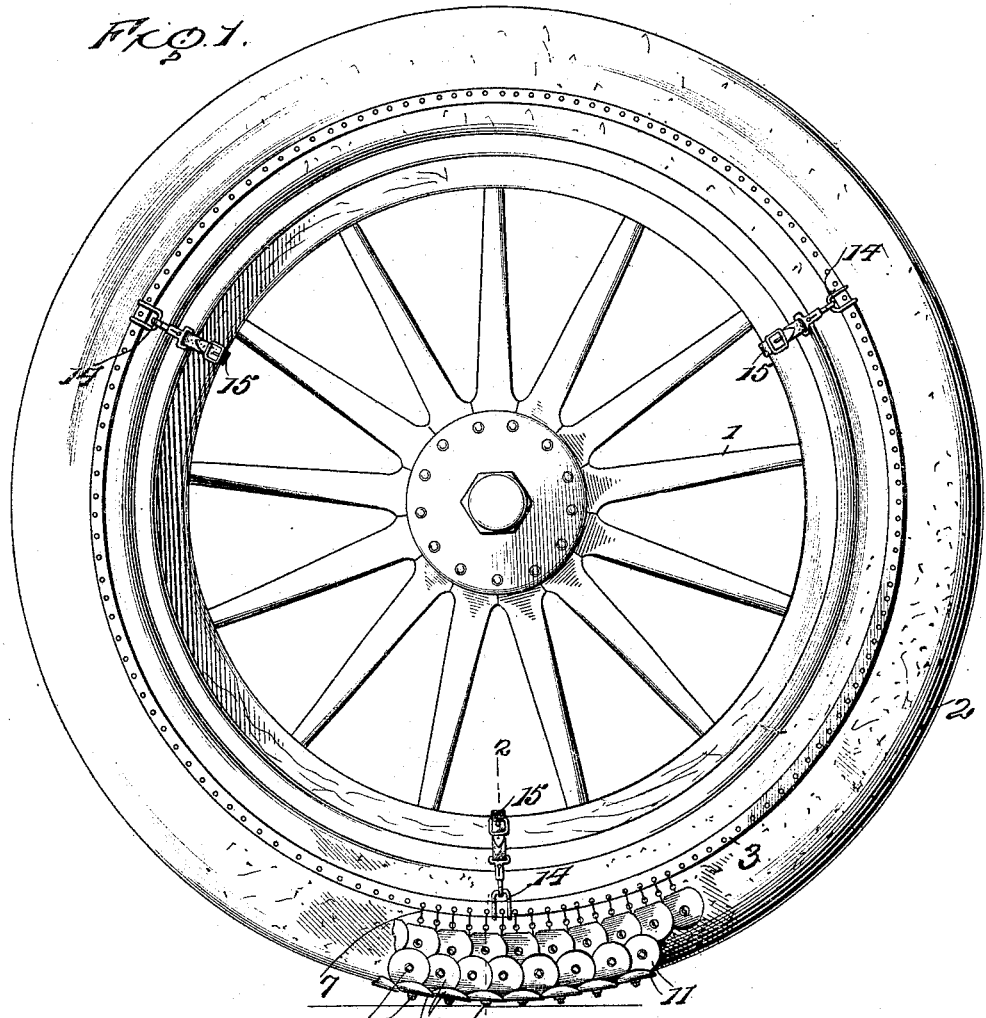
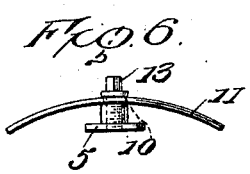
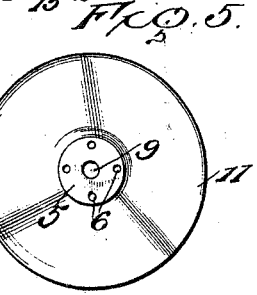
Witnesses
W. N. Woodson.
Juana M. Fallin.
Inventor
J. M. Barnett
By
H. & A. R. Lacey, Attorneys.

J. M. BARNETT.
ARMOR FOR TIRES.
APPLICATION FILED JUNE 8, 1910.
994,969.
Patented June 13, 1911.
2 SHEETS—SHEET 2.
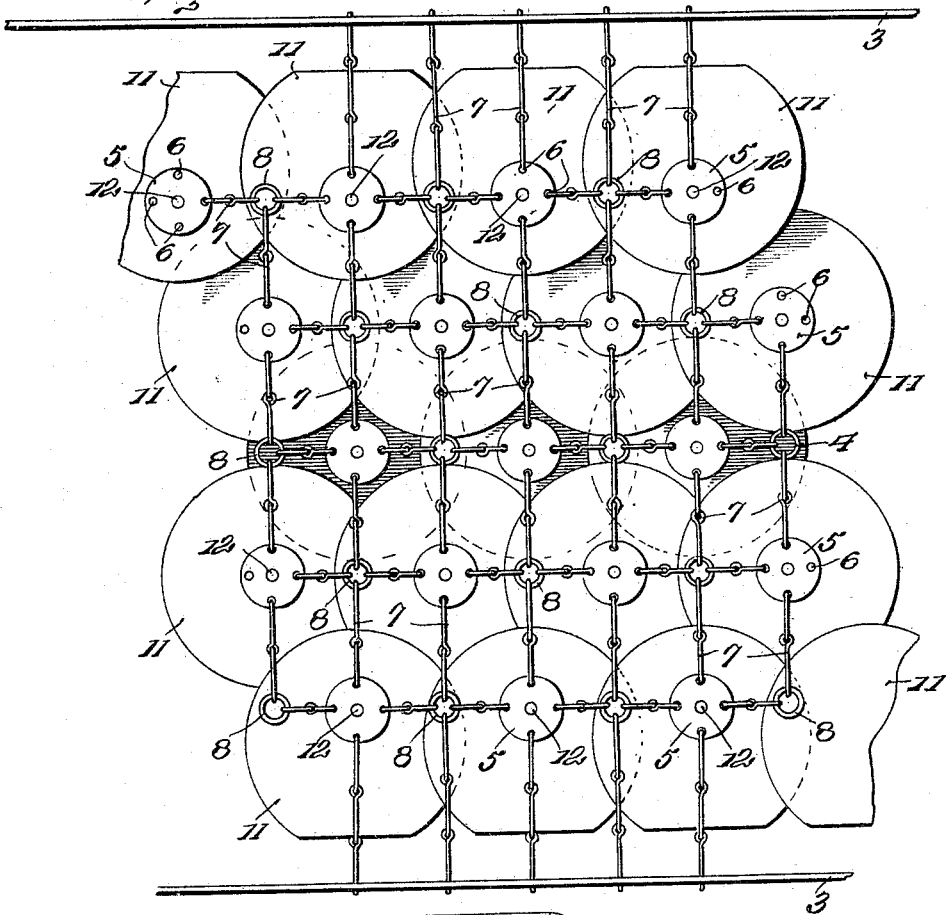
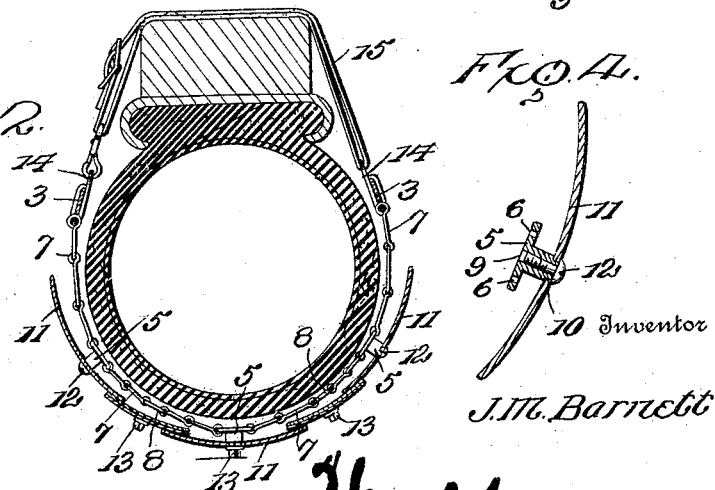
Witnesses
Inventor
J. M. Barnett
Attorneys

UNITED STATES PATENT OFFICE.

JOHN M. BARNETT, OF OSKALOOSA, IOWA.

ARMOR FOR TIRES.

994,969.  Specification of Letters Patent.  Patented June 13, 1911.

Application filed June 8, 1910. Serial No. 565,719.

*To all whom it may concern:*

Be it known that I, JOHN M. BARNETT, a citizen of the United States, residing at Oskaloosa, in the county of Mahaska and State of Iowa, have invented certain new and useful Improvements in Armor for Tires, of which the following is a specification.

This invention comprehends certain new and useful improvements in armor for pneumatic tires, and the object of the invention is an improved device of this character which is arranged to effectually inclose the tread in order to protect the same from puncture and wear and to prevent skidding, and which at the same time has sufficient play so as not to interfere with the resiliency of the tire, the armor being adapted to be readily applied to the exterior of the tire, and embodying to a marked degree the characteristics of simplicity, durability and strength.

With this and other objects in view that will more fully appear as the description proceeds, the invention consists in certain constructions and arrangements of the parts that I shall hereinafter fully describe, and then point out the novel features thereof in the appended claims.

For a full understanding of the invention and the merits thereof, and to acquire a knowledge of the details of construction, reference is to be had to the following description and accompanying drawing, in which:

Figure 1 is a side elevation of a wheel equipped with my improved armor; Fig. 2 is a transverse section of the tire and armor, the section being taken on the line 2—2 of Fig. 1; Fig. 3 is a plan view of the armor looking from the inside; Fig. 4 is a section of one of the disks and the plate attached thereto; Fig. 5 is a bottom plan view thereof; Fig. 6 is an edge view; Fig. 7 is a side view; and, Fig. 8 is a detail view of one of the blocks.

Corresponding and like parts are referred to in the following description and indicated in all the views of the drawing by the same reference characters.

For the purpose of illustration, I have shown and described my improved armor as applied to a wheel 1 which has a pneumatic tire 2, and which may be of any desired or approved construction or design. Arranged on opposite sides of the tire are two rings 3 between which is secured a chain netting 4 that extends across and conforms with the contour of the tread. Incorporated in this netting, are a plurality of metallic blocks or disks 5 which are arranged in longitudinal rows with the middle row disposed medianly on the tread, and with the blocks of adjacent rows positioned in staggered relation. The blocks 5 are formed in their marginal portions with series of apertures 6 to which short chains 7 are connected at one end, the opposite ends of the chains being attached to rings 8 that are interposed between adjacent blocks. The blocks 5 are also formed with central threaded apertures 9, and in their outer faces around such apertures, with bosses 10, the latter being designed to be received in openings in plates or scales 11 which complete the formation of the mail-like armor. In the preferred structure, the bosses and openings of the plates are correspondingly polygonal in cross section in order to hold the latter against any turning movement relative to the former.

12 designates a plurality of screws or threaded studs that are inserted through the openings in the plates and engaged with the threaded openings 9 in order to detachably secure the scales to the respective disks, sundry of said studs being provided with enlarged heads 13 which are adapted to prevent the tire from slipping or skidding, and which are preferably polygonal in cross section so as to be susceptible of being manipulated by a wrench or similar tool. The remaining studs have heads of the conventional screw form.

The plates or scales may be of any suitable size or shape, and overlap each other so that the armor completely incloses the tread to protect the same from wear and puncture. It will be observed, by reference to Fig. 1, that the forward portion of each scale of a longitudinal row overlaps the rear portion of the scale just in front, such an arrangement being advantageous, in that the possibility of tacks or like objects working between the plates during the rotation of the wheel, is effectually precluded.

The separate armor plates are independently supported by their bosses in spaced relation to the chain fabric, and hence are afforded a maximum amount of play so as not to interfere with the natural resiliency of the tire. A plurality of short chains 7 are connected to each of the blocks 5 and permit the same to have a limited turning or twisting movement without injury to the chain fabric, thereby attaining a material advantage over the ordinary form of armor wherein the plates are riveted to a canvas or like fabric base or foundation. The armor is applied to the wheel when the tire is deflated. Upon the inflation of the tire the armor conforms to the contour of the tread and tends to remain thereon against accidental displacement. As a precautionary measure, however, the rings 3 are equipped at corresponding points with loops 14 through which are inserted straps 15 that are buckled across the felly of the wheel.

An armor constructed in accordance with my invention, may be manufactured at a comparatively small cost; will withstand excessive wear, and is susceptible of being easily and cheaply repaired, and without the necessity of employing skilled labor, thus recommending itself particularly for use by automobilists and others using vehicles having pneumatic tires.

Having thus described the invention what is claimed as new is:

1. An armor for tires, embodying a chain netting adapted to inclose the tread of the tire and having a plurality of blocks incorporated therein, a plurality of overlapping armor plates, and fastening means for detachably securing the armor plates to the respective blocks.

2. An armor for tires, embodying chain fabric composed of a plurality of blocks and a plurality of links connecting the adjacent blocks, and a plurality of armor plates secured to the respective blocks.

3. An armor for tires, including a chain fabric having a plurality of members incorporated therein, each of said members being formed with an outstanding boss, and armor plates secured on the bosses of the respective members.

In testimony whereof I affix my signature in presence of two witnesses.

JOHN M. BARNETT. [L. S.]

Witnesses:
 CUSTIS A. ABBOTT,
 LENA L. ROENE.